Patented Dec. 30, 1930

1,786,907

UNITED STATES PATENT OFFICE

CLARK H. GEPPERT, OF DES MOINES, IOWA

METHOD OF REPAIRING APPAREL SHOES

No Drawing.   Application filed July 2, 1929. Serial No. 375,588.

The object of my invention is to provide an improved method of repairing shoes with the use of my improved composition, and whereby the shoes may be repaired readily, quickly and easily by unskilled persons, and whereby the wearing surface of the sole is made smooth and regular to thereby present the appearance of an ordinary leather sole.

My invention consists in the various steps of the method used in apparel shoe repair work and the like.

I have experimented with and exhaustively tested various substitutes for the several ingredients of my improved formula, but thus far have had the most successful results by the use of the following formula:

10 ounces builders' cement.
10 ounces rubber.
1½ ounces rosin.
2 ounces shellac.
6 ounces sole leather scrap.
1 quart benzine.

For the builders' cement ingredient I employ the kind of cement commonly known as Portland cement; for the rubber ingredient, I employ pure raw rubber; for the rosin ingredient I preferably employ powdered rosin; for the shellac ingredient I preferably employ shellac in liquid form; for the sole leather scrap I preferably employ sole leather cut or ground into particles or strips about the size of saw dust; and for the solvent element I have successfully employed benzine.

The rubber and the rosin are first dissolved in the benzine. Then the shellac is added, and finally the sole leather scrap and builders' cement is added, and the mass is then thoroughly commingled until each particle of sole leather is completely surrounded by the semi-liquid solution, which is then sealed in air-tight containers and is ready for use.

I have determined by tests that by the use of benzine as a solvent for the rubber and rosin, I am enabled to obtain a thorough chemical combination of these two ingredients, in the manner which produces a far better shoe sole repair mixture than can be obtained by the use of ingredients like naptha as a solvent.

When using naptha I have found that the naptha when mixed with the crude rubber and rosin tends to form an emulsion, giving it the semblance of a solution, but not actually forming a chemical combination.

I find by actual tests that in a large number of cases when benzine is used as a solvent, the resultant product will wear several times as long as when naptha or the like is used for this purpose, and in addition, the material will adhere to the leather shoe far better and will not crack upon drying or bending.

I further find by actual tests that when benzine is mixed with builders' cement, then when exposed to the air, the benzine will evaporate and will not cause the cement to set and harden. I also find that with my formula the builders' cement will not set and harden in the mass after the benzine has evaporated.

My improved method of repairing apparel shoes is as follows:

Assuming that the sole of the shoe is worn through at some point, I first thoroughly dry the leather adjacent to the place to be repaired, and then I abrase or scarify the leather of the apparel shoe at the point where the repair is to be made. I then preferably apply the composition by placing in the container a knife or blade and taking so much of the composition as will adhere to it, and then spreading it over the roughened surface of the apparel shoe to be repaired, at the same time pressing it thoroughly into the abrased or scarified portions of the apparel shoe. Within a short time after applying a layer of the material to a shoe, about ten minutes, I then apply water to the layer, preferably with a brush, and find by tests that the water will penetrate through the mass of material by capillary action through the particles of builders' cement until every particle of builders' cement has had water applied to it to such an extent at least that it will set and harden.

If considerable thickness of the repair is desirable, I add layer after layer of the material before the succeeding layer has completely dried. Then when the desired thickness has been obtained, the shoe is permitted to dry and is ready for use in about twelve hours.

I have found by repeated tests that this work can be readily done by unskilled persons, and that after the material has been applied and the solvent has evaporated out of it, there will be a perfect bond between the composition and the abrased or scarified shoe, so that it is wholly unnecessary to use any tacks or sewing for the purpose of holding the repair to the shoe.

I have found furthermore that the rubber element in substantially the proportions named will cause the completed shoe repair, after the solvent has evaporated, to maintain a flexible quality of substantially that of ordinary sole leather, and the composition will be prevented from cracking or breaking due to the ordinary uses to which an apparel shoe is subjected.

I have also found that the cement element will make the layer relatively hard and firm and give to it substantially the wearing qualities of leather without wholly destroying its flexibility, which is substantially that of ordinary sole leather, apparently due to the fact that particles of cement are thoroughly mixed throughout the mass and the other material between the particles of cement maintains its flexibility.

I have found that the rosin element gives to the composition a greater firmness than could be obtained by the use of the rubber and leather alone, and which is desirable in soles for apparel shoes.

I have also found that the shellac element when combined with the other elements causes the composition, when applied to the shoe in the manner before defined, to penetrate deeply into, and adhere to, the abrased or scarified shoe sole to such an extent that it is unnecessary to sew or otherwise secure it to the shoe.

I have also found that the sole leather scrap gives added wearing qualities to the composition, and at the same time gives a certain body to the composition which enables the operator to more readily and easily apply a relatively thick layer to the shoe being repaired.

I claim as my invention:

The method of repairing apparel shoes, which consists in applying to the sole of the shoe a semi-liquid mass containing rubber dissolved in a solvent such as benzine, and also containing a quantity of builders' cement, then applying the mass to a shoe sole, and then applying water to cause the cement to set and harden upon the evaporation of the solvent and the water.

Des Moines, Iowa, June 21, 1929.

CLARK H. GEPPERT.